Dec. 4, 1945.   B. C. BREDENBECK   2,390,201
SEAL ASSEMBLY
Filed Oct. 16, 1944
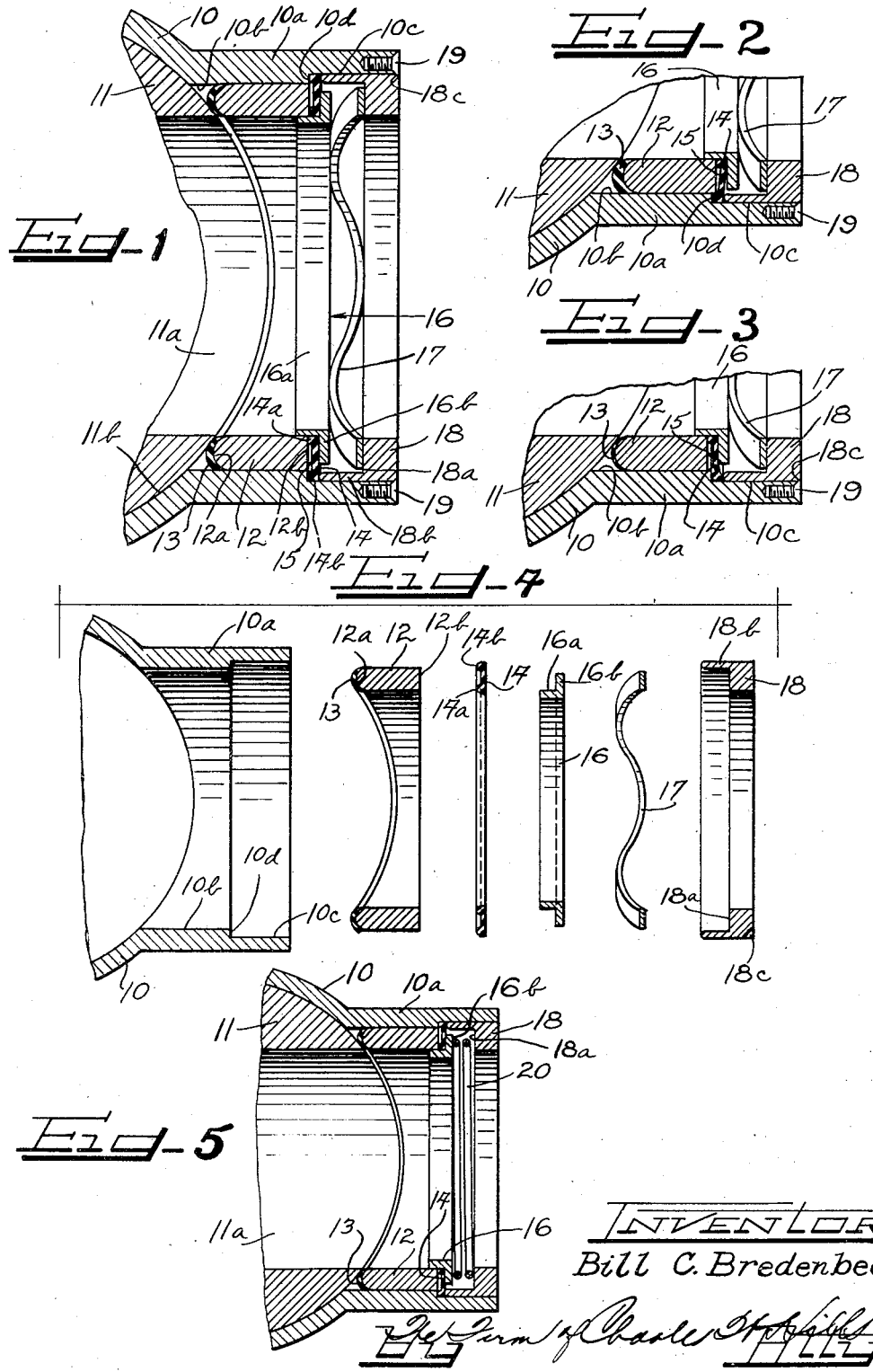

Patented Dec. 4, 1945

2,390,201

UNITED STATES PATENT OFFICE 2,390,201

SEAL ASSEMBLY

Bill C. Bredenbeck, Parma, Ohio, assignor to Thompson Products, Inc., Cleveland, Ohio, a corporation of Ohio Application October 16, 1944, Serial No. 558,818

7 Claims. (Cl. 251—113)

This invention relates to seals for fluid flow control devices and the like.

Specifically, the invention deals with slidable seal assemblies having end faces for sealing engagement with movable valve members and equipped with a flexible diaphragm to prevent leakage between the seal and the member in which it is slidably mounted.

The invention will be hereinafter specifically described in connection with a coupling or valve assembly embodying a ported casing and a rotatable valve part or plug for selectively opening and closing the port. It should be understood, however, that the seals of this invention are generally useful in many other devices.

Couplings of the type refered to are used in many installations where vibration is encountered tending to cause the couplings to leak. For example, quick disconnect couplings for airplanes are frequently subjected to vibratory movements that so shake the couplings that the seals are no longer efficient, especially at very low temperatures where resiliency of plastic materials used in the seals, such as synthetic rubber and the like, is materially decreased.

The seals of this invention are highly effective throughout a wide temperature range, being movable at low temperatures to take up wear and contraction and remaining non-tacky at elevated temperatures to permit smooth movement of the valve parts.

The seals of this invention need not be subjected to high loads to maintain their efficiency throughout a wide temperature range, and heretofore commonly encountered "breakaway" resistance to valve movement is eliminated.

An object of the invention, therefore, is to provide a seal assembly which is very efficient throughout a wide temperature range even when subjected to very low loads.

A further object of the invention is to provide a seal assembly for couplings, valves, and the like fluid flow control devices which includes a flexible diaphragm member for sealing a slidable assembly to the part in which it is slidably mounted without interfering with sliding movements of the assembly.

Another object of the invention is to provide a seal for mounting in the port of a valve to seal the plug of the valve with a flexible diaphragm to eliminate leakage around the seal.

Another object of the invention is to provide a seal for a coupling or valve which is slidably mounted in the port of a casing and has an end face sealingly engaging the plug of the valve or coupling, together with an opposed end face coacting through a flexible diaphragm with the casing to be sealingly connected to the casing.

A specific object of the invention is to provide a spring-pressed slidable seal assembly with a flexible sealing ring having inner and outer peripheral portions respectively clamped to the slidable seal assembly and to the member in which the seal assembly slides.

Other and further objects of the invention will be apparent to those skilled in the art from the following detailed description of the annexed sheet of drawings which, by way of preferred examples only, illustrate two embodiments of the invention.

On the drawing:

Figure 1 is a fragmentary cross-sectional view taken through a fluid-flow control device equipped with a seal according to this invention.

Figure 2 is a fragmentary view similar to Figure 1 but illustrating a rearwardly shifted position for the seal.

Figure 3 is a view similar to Figure 1 but illustrating a forwardly shifted position for the seal.

Figure 4 is an exploded vertical cross-sectional view of the seal parts and the ported member in which the parts are mounted.

Figure 5 is a view similar to Figure 1, but illustrating a modified type of spring for the seal assembly.

As shown on the drawing:

In Figure 1, the reference numeral 10 designates a valve or couple casing. The casing 10 has a laterally projecting boss portion 10a having a cylindrical bore 10b therethrough providing a port. A counterbore 10c is provided at the outer end of the bore 10b to cooperate with the bore 10b for defining a shoulder 10d.

A valve or plug member 11 is rotatably mounted in the casing 10 and has a passage 11a therein adapted to register with the port of the casing. The valve 11 also has a wall 11b adapted to close the port of the casing.

In accordance with this invention a seal assembly is mounted in the port provided by the boss portion 10a of the casing 10 for preventing leakage so that no fluid flow will occur when the wall portion 11b of the plug closes the port, and so that all of the fluid flow will be through the port and passage when the passage 11a of the plug is in registration with the port.

The seal assembly of this invention includes a rigid retainer sleeve 12 slidably mounted in the bore 10b. This sleeve has a rounded and dished end face 12a covered with resilient material 13 such as rubber or the like which is directly vulcanized to the end face 12a. The cover 13 has a rounded contour like the end face 12a and sealingly engages the wall 11b of the plug 11.

The retainer sleeve 12 has a flat end face 12b at the end thereof opposite the curved end 12a thereof. A rubber diaphragm ring 14 is seated over the end face 12b and has an inner peripheral bead 14a engaging the end face 12b adjacent the inner end thereof. The diaphragm ring 14 also has an outer peripheral bead 14b seated on the shoulder 10d of the casing part 10a. The beads 14a and 14b serve to space the main web of the diaphragm ring 14 away from the end face 12b so as to provide a space 15 between the end face 12b and the ring.

A rigid follower ring 16 has a collar portion 16a fitting within the rubber ring 14 and retainer sleeve 12 together with an outturned flange 16b overlying the diaphragm ring 14. The collar portion 16a has a snug sliding fit with the inner face of the retainer sleeve 12.

A corrugated spring washer 17 acts on the follower 16. This corrugated spring washer 17 is loaded by a locking ring 18 which has a sliding fit in the counterbore 10c of the housing part 10a. This locking ring 18 has an inner face portion 18a bottoming the washer 17 together with a skirt or gland portion 18b extending inwardly from the face 18a to engage the outer peripheral portion of the diaphragm ring 14.

Screws 19 are threaded into the end of the housing part 10a and have heads overlying the retainer ring 18 to secure the retainer ring in position in the housing part 10a. The retainer ring can be provided with notches 18c in its outer face to receive the screw heads.

The skirt 18b of the locking ring 18 clamps the outer peripheral portion of the diaphragm 14 against the shoulder 10d. The locking ring also loads the corrugated spring washer 17 and causes it to press the follower ring 16 for sealingly clamping the inner peripheral portion of the diaphragm on the end face 12b of the retainer sleeve. The spring washer 17 also urges the retainer sleeve 12 in a direction toward the plug 11 so that the resilient cover on the end face 12a of the sleeve 12 will be maintained in sealing engagement with the plug.

The diaphragm 14 prevents leakage around the retainer sleeve 12 and sealingly connects this sleeve to the housing part 10a.

As illustrated in Figures 2 and 3, the diaphragm 14 does not interfere with sliding movement of the retainer sleeve 12 in the bore 10b since its inner peripheral portion can readily deflect relative to its fixedly clamped outer peripheral portion. The space 15 between the beads of the ring 14, as shown in Figure 2, accommodates rearward sliding movement of the sleeve 12 outwardly in the counterbore 10b. Such a position can be encountered, for example, when the coating 13 on the sleeve 12 is new and relatively thick.

As shown in Figure 3, the diaphragm 14 also permits a free forward movement of the retainer sleeve 12 as, for example, when the coating 13 on the end face of this retainer sleeve becomes thin due to wear.

The flexing of the diaphragm ring 14 requires only a minimum amount of spring pressure, and does not in any way interfere with sliding movement of the sleeve. As a result, the spring loads on the sleeve can be quite slight and breakaway resistance to rotation of the plug 12 in the valve housing is materially reduced. As illustrated in Figure 4, the parts are readily assembled by merely dropping the same into the bore and counterbore of the housing part 10a.

In the embodiment of the invention shown in Figure 5, parts identical with parts described in connection with Figures 1 to 4 have been marked with the same reference numerals. In Figure 5, however, the corrugated spring washer 17 is replaced with a coil spring 20. The space between the flange 16b of the follower ring 16 and the face 18a of the locking ring 18 will accommodate either a spring washer or a coil spring.

The seals of this invention do not impede flow through the port since the only part of the seal that projects into the port is the collar 16a of the pressing follower 16 and, if desired, this collar could be seated in a counterbore provided at the rear end of the inner face of the follower 12.

From the above descriptions it should be understood that the invention provides a slidable seal assembly having a sealing end face and equipped with a flexible diaphragm to sealingly connect the assembly with a part in which it is slidably mounted without interfering with free sliding movements of the assembly. The diaphragm arrangement of this invention remains quite flexible even at low temperatures and will efficiently operate throughout a wide temperature range.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A seal assembly for valves and the like comprising a retainer sleeve having a sealing end face, a diaphragm having an inner peripheral portion engaging the end face of the retainer sleeve opposite the sealing end face thereof, a follower ring having a collar portion fitting within the diaphragm and retainer sleeve together with an outturned flange portion for overlying the diaphragm, spring means pressing said follower ring to urge the sealing end face of the retainer sleeve against the part to be sealed, and means for sealingly clamping the outer peripheral portion of the diaphragm to a part in which said retainer sleeve is slidably mounted.

2. A seal assembly comprising a retainer sleeve having a sealing end face in one end thereof and an opposed end face at the other end thereof, a diaphragm ring overlying said opposed end face, a follower ring having a collar portion projecting through said diaphragm ring and a flange portion for overlying said diaphragm ring, spring means acting on said follower ring to sealingly clamp the inner peripheral portion of the diaphragm on the opposed end face of the retainer sleeve, and means for sealingly clamping the outer peripheral portion of the diaphragm.

3. A seal assembly comprising a rigid retainer sleeve having a sealing end face and an opposed end face, a flexible diaphragm overlying said opposed end face, said flexible diaphragm having inner and outer peripheral beads thereon, said inner bead engaging said opposed end face and said outer bead projecting outwardly beyond the retainer sleeve, a rigid follower ring overlying the inner peripheral portion of the diaphragm ring, means for engaging the outer peripheral portion of said diaphragm ring to sealingly clamp the outer bead on a part slidably receiving the retainer sleeve, and a spring bottomed on said means acting on said follower ring to urge the retainer sleeve in a direction for maintaining the sealing face thereof in sealing engagement with a part to be sealed.

4. In a fluid flow control device including a ported member and a shiftable member for opening and closing the port in the ported member, a seal assembly for said port of the ported member comprising a rigid retainer sleeve slidably mounted in said port having a sealing end face for engaging said shiftable member, a flexible diaphragm ring having an inner peripheral bead seated on the end face of the sleeve opposite the sealing end face thereof and projecting radially outward beyond the sleeve, a follower ring having a collar portion projecting through the diaphragm ring into the retainer sleeve together with an outturned flange portion overlying a portion of the diaphragm ring, a spring acting on said follower ring, and a locking ring secured to said casing having an end face bottoming the spring and a skirt portion clamping the outer peripheral portion of the diaphragm to the casing.

5. In a fluid flow control device including a ported member having a counterbore providing an internal shoulder and a shiftable member coacting with the port of the ported member, a seal assembly comprising a rigid retainer sleeve slidably mounted in the port of said member and having a sealing end face for engaging said shiftable member together with an opposed end face substantially aligned with the shoulder in said ported member, a flexible diaphragm ring having an inner peripheral bead seated on the inner peripheral portion of said opposed end face and coacting to normally hold the main body of the ring away from said opposed end face, said diaphragm ring projecting radially beyond the retainer sleeve into said counterbore and having an outer peripheral bead bottomed on said shoulder, a follower ring having a collar projecting through said diaphragm ring into said retainer sleeve together with an outturned flange overlying the inner marginal portion of said diaphragm ring, a locking ring seated in said counterbore having a skirt portion engaging the outer peripheral portion of said diaphragm ring to sealingly clamp the outer bead of said ring on said shoulder, and a spring within said skirt portion of the locking ring bottomed on said locking ring and acting on said follower ring to urge the retainer sleeve toward the shiftable member, said inner and outer beads on the diaphragm ring holding the main body of the diaphragm ring away from the retainer sleeve to accommodate free flexing of the diaphragm ring.

6. In a fluid flow control device including a casing having a port defined by a cylindrical bore and a counterbore at the outer end of the cylindrical bore coacting therewith to define an internal shoulder together with a valve member in the casing for opening and closing the port, a cylindrical metal retainer sleeve slidably mounted on said bore having a rounded end face adjacent said valve member, a resilient covering bonded to said rounded end face providing a seal for engaging said valve member, said sleeve having a flat end face opposite said rounded end face normally lying adjacent said shoulder, a rubber diaphragm ring having inner and outer marginal beads respectively seated on the flat end face of the sleeve and on the shoulder of the casing, said beads cooperating to provide a space between the main portion of the ring and the flat end face of the sleeve, a follower ring having a collar projecting through said diaphragm ring into said sleeve together with an outturned flange overlying the inner portion only of said sleeve, a locking ring seated in said counterbore having a peripheral skirt acting on the outer portion of the diaphragm ring to sealingly clamp the outer bead thereof on said shoulder, said locking ring having an end face portion within said skirt spaced from the outturned flange of said follower ring, and a corrugated spring washer compressed between the outturned flange of the follower ring and said face portion of the locking ring for urging the resilient coating on the rounded end face of the retainer sleeve into sealing relation with said valve member.

7. In a fluid flow control device embodying a casing having a port defined by a cylindrical bore and equipped with a counterbore at the outer end portion thereof coacting therewith to provide an internal shoulder, a plug shiftably mounted in said casing to open and close said port, a metal retainer sleeve slidably mounted in said bore having a first end face adjacent said plug and a second end face adjacent said shoulder, resilient means on said first end face sealingly engaging said plug, a flexible diaphragm member having inner and outer marginal beads respectively seated on said second end face and said shoulder, a follower ring overlying a portion of said diaphragm, a locking ring in said counterbore clamping said outer marginal bead into sealing engagement with said shoulder, and a coil spring bottomed on said locking ring and acting on said follower ring to sealingly clamp the inner bead of the diaphragm on said second end face of the retainer sleeve while urging the retainer sleeve toward the plug.

BILL C. BREDENBECK.